Patented May 10, 1932

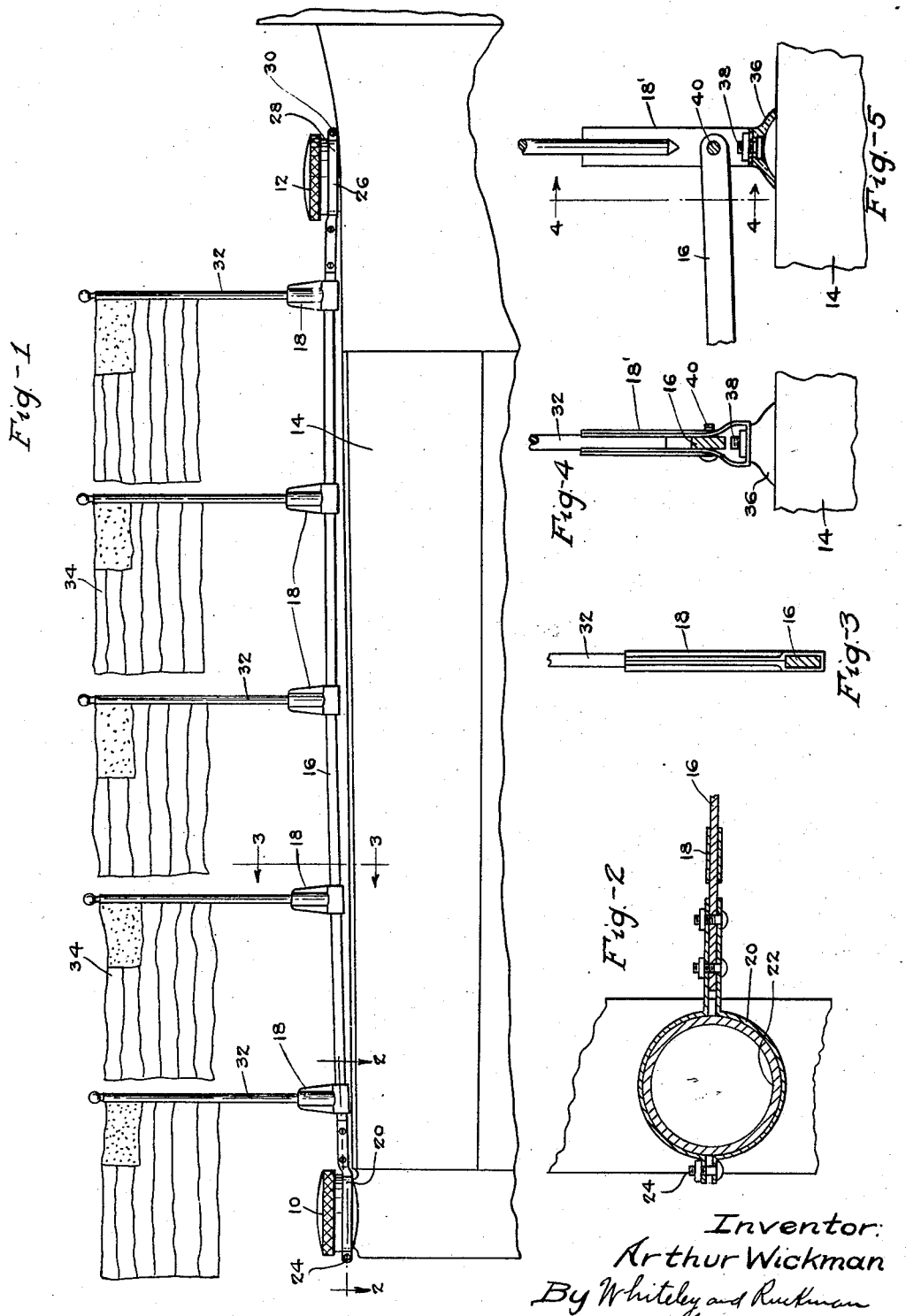

1,857,774

UNITED STATES PATENT OFFICE

ARTHUR WICKMAN, OF MINNEAPOLIS, MINNESOTA

FLAG HOLDER FOR AUTOMOBILES

Application filed June 9, 1928. Serial No. 284,087.

My invention relates to flag holders for automobiles, and an object is to provide a device adapted to be supported above the hood of an automobile, this device being of an elongated character in order that a number of flags may be carried thereby in spaced relation to each other longitudinally. An object in particular is to provide a device of this character adapted for use in connection with an automobile by securing it to the neck of the radiator at the front of the hood and to the neck of the gasoline tank at the rear of the hood.

The full objects and advantages of my invention will appear in connection with the detailed description thereof, and the novel features of my inventive idea will be particularly pointed out in the claims.

In the accompanying drawings which illustrate two forms in which my invention may be embodied,—

Fig. 1 is a side elevational view showing my device supported just above the hood of the automobile. Fig. 2 is a view in horizontal section on the line 2—2 of Fig. 1. Fig. 3 is a view in vertical section on the line 3—3 of Fig. 1. Fig. 4 is a view of a modified construction taken in section on the line 4—4 of Fig. 5. Fig. 5 is a view taken at right angles to Fig. 4.

Fig. 1 shows my device attached to an automobile in which there is a radiator cap 10 at the front and a gasoline tank cap 12 at the rear of the hood 14. My device embodies a bar 16 to which a number of spaced socket members 18 are secured in suitable manner as by spot welding. To the front end of the bar 16, a split ring 20 is secured in suitable manner as by bolts or spot welding. The ring 20 is passed around the neck 22 which receives the cap 10 and is secured by a bolt 24. A similar split ring 26 is secured to the rear end of the bar 16 and is passed around the neck 28 which receives the cap 12 and is secured by a bolt 30. The sockets 18 may be of any suitable number and are adapted to receive the staffs 32 of flags or pennants 34. The device is adapted for use with automobiles not having a gasoline tank cap at the rear of the hood by employing a rubber suction cup 36 in place of the split ring at the rear end of the bar as shown in Figs. 4 and 5. The rear socket member 18' is extended below the bar 16 so that the cup 36 may be attached to the lower end of this socket member by a bolt 38. The socket member 18' is shown attached to the bar 16 by a bolt 40. The cup 36 when pressed down holds the rear end of the bar 16 in place.

I claim:

A flag holder for automobiles comprising an elongated bar adapted to extend lengthwise of the hood of the automobile, a split ring carried by the front of said bar and adapted to be secured around the neck of the radiator, a socket member extending up from the rear of said bar for receiving the staff of a flag, said socket member extending below said bar, and a suction cup carried by the lower end of said socket member for attaching said bar at the rear of the hood.

In testimony whereof I hereunto affix my signature.

ARTHUR WICKMAN.